US011033944B2

(12) United States Patent
Ruppert et al.

(10) Patent No.: US 11,033,944 B2
(45) Date of Patent: Jun. 15, 2021

(54) TOOL HOLDERS USABLE WITH TOOLING HAVING DIFFERENT TANG STYLES, AND SEATING/SECURING COMPONENTS OF SUCH HOLDERS

(71) Applicant: Wilson Tool International Inc., White Bear Lake, MN (US)

(72) Inventors: Clint Ruppert, Pine Springs, MN (US); Andrew Paulson, Hugo, MN (US)

(73) Assignee: WILSON TOOL INTERNATIONAL INC., White Bear Lake, MN (US)

( * ) Notice: Subject to any disclaimer, the term of this patent is extended or adjusted under 35 U.S.C. 154(b) by 204 days.

(21) Appl. No.: 16/147,856

(22) Filed: Sep. 30, 2018

(65) Prior Publication Data

US 2020/0101510 A1    Apr. 2, 2020

(51) Int. Cl.
*B21D 5/02* (2006.01)
*B23Q 1/26* (2006.01)

(52) U.S. Cl.
CPC ............ *B21D 5/0236* (2013.01); *B23Q 1/26* (2013.01)

(58) Field of Classification Search
CPC .. B21D 5/0209; B21D 5/0236; B21D 5/0254; B21D 37/06; B23Q 1/25; B23Q 1/26; B23Q 1/32
USPC ......... 72/481.1, 482.1, 482.2, 482.6, 482.91, 72/482.93
See application file for complete search history.

(56) References Cited

U.S. PATENT DOCUMENTS

| 5,022,256 A | 6/1991 | Van Der Meulen | |
|---|---|---|---|
| 5,511,407 A * | 4/1996 | Kawano | B21D 5/0209 72/462 |
| 5,619,885 A * | 4/1997 | Kawano | B21D 5/0209 72/389.3 |
| 6,003,360 A * | 12/1999 | Runk | B21D 5/0236 72/389.3 |
| 6,138,492 A * | 10/2000 | Vining | B21D 5/0209 72/389.3 |
| 6,446,485 B1 | 9/2002 | Tarasconi | |
| 6,848,291 B1 * | 2/2005 | Johnson | B21D 5/0209 72/481.1 |
| 9,555,456 B2 | 1/2017 | Rogers et al. | |
| 10,189,067 B2 | 1/2019 | Rogers | |
| 10,300,518 B2 | 5/2019 | Rogers | |
| 2004/0074278 A1 * | 4/2004 | Hayashi | B21D 5/0209 72/481.2 |

(Continued)

FOREIGN PATENT DOCUMENTS

| EP | 3311931 A1 * | 4/2018 | ............ B21D 5/0245 |
|---|---|---|---|
| WO | 9901240 A1 | 1/1999 | |

(Continued)

OTHER PUBLICATIONS

International Patent Application No. PCT/US2019/053130, Invitation to Pay Additional Fees and Partial Search Report dated Dec. 12, 2019, 15 pages.

(Continued)

*Primary Examiner* — Shelley M Self
*Assistant Examiner* — Katie L. Parr
(74) *Attorney, Agent, or Firm* — Fredrikson & Byron, P.A.

(57) ABSTRACT

A tool holder and differing designs of movable portions that can be interchangeably mounted with the holder depending on the tang profile of the tool needing to be seated and secured to the holder.

14 Claims, 7 Drawing Sheets

(56) References Cited

U.S. PATENT DOCUMENTS

| | | | | |
|---|---|---|---|---|
| 2004/0103710 A1* | 6/2004 | Gascoin | ............... | B21D 5/0209 |
| | | | | 72/482.2 |
| 2005/0081596 A1* | 4/2005 | Ferrari | ................ | B21D 5/0236 |
| | | | | 72/481.1 |
| 2009/0071223 A1* | 3/2009 | Rogers | .................. | B21D 37/02 |
| | | | | 72/481.1 |
| 2011/0247389 A1* | 10/2011 | Rouweler | ............ | B21D 5/0209 |
| | | | | 72/389.3 |

FOREIGN PATENT DOCUMENTS

| | | | |
|---|---|---|---|
| WO | 0059684 | A1 | 10/2000 |
| WO | 02092253 | A2 | 11/2002 |
| WO | 2005039795 | A1 | 5/2005 |
| WO | 2015164483 | A1 | 10/2015 |

OTHER PUBLICATIONS

Publication WO 2020/069110 A3, with International Search Report, observations, and Written Opinion, published Apr. 30, 2020, 26 pgs.

* cited by examiner

TOOL HOLDERS USABLE WITH TOOLING HAVING DIFFERENT TANG STYLES, AND SEATING/SECURING COMPONENTS OF SUCH HOLDERS

FIELD OF THE INVENTION

The present invention relates generally to tool holders for use with industrial machines or equipment, and seating/securing components of such holders.

BACKGROUND

Sheet metal and other workpieces can be fabricated into a wide range of useful products. The fabrication (i.e., manufacturing) processes commonly employed involve bending, folding, and/or forming holes in the sheet metal and other workpieces. The equipment used for such processes involve many types, including turret presses and other industrial presses (such as single-station presses), Trumpf style machines and other rail type systems, press brakes, sheet feed systems, coil feed systems, and other types of fabrication equipment adapted for punching or pressing sheet materials.

Concerning press brakes, they are equipped with a lower table and an upper table, and are commonly used for deforming metal workpieces. One of the tables (typically the upper table) is configured to be vertically movable toward the other table. Forming tools are mounted to the tables so that when one table is brought toward the other, a workpiece positioned there between can be formed, e.g., bent into an appropriate shape. Typically, the upper table holds a male forming tool (a punch) having a bottom workpiece-deforming surface (such as a V-shaped surface), and the bottom table holds an appropriately-shaped female tool (a die) having an upper surface vertically aligned with the workpiece-deforming surface of the male tool.

As is known, forming tools are commonly mounted to press brake tables via use of one or more tool holders provided on the tables. Particularly, upper portions of the tools, commonly referred to tangs or shanks, are inserted between opposing walls of the holder, and these walls are configured to form a channel within which the tool tang can be secured. Quite often, the channel is defined via a stationary portion of the tool holder and an opposing movable portion of the holder.

Some tooling styles, such as European or Promecam tooling, have been known to employ differing tang profiles. European style tooling normally dictates safety slots being define in their tangs, but in terms of their differing tang profiles, this is generally relative to the surface or extent of the tang that extends upward from the safety slot. For example, the tang surface can be straight (parallel with vertical plane), beveled (having an angle to vertical plane), or curved. To that end, tool holders have been designed for press brake applications which are capable of being used with tools having different tang profiles.

While such multi-functional tool holder designs have provided flexibility, drawbacks have also been encountered. For example, some tool holders have been configured to require use of intermediary adaptors in accommodating different tang styles, which can necessitate proper propositioning and/or maintenance relative to the adaptors. While with some of these designs, the adaptors are held in a set orientation, they are often moved inwardly toward the tool tangs at different distances corresponding to the tang styles. These differing movements, and corresponding variances in force applied to accommodate such movements, typically dictate precise regulation of the force, or else damage can result to the tangs and/or the tool holders from contact there between. Such regulation has conventionally been provided via hydraulic, pneumatic, electric, or other like means, whereby the applied forces can be precisely administered, although incorporation of these elements adds complexity and overall cost to the designs.

Another variable given consideration in the design of tool holders is with regard to various tolerances. For example, there can be slight degrees of variance with each tool and tool holder design, such as relating to general dimensions of the tool (e.g., its tang) or actions of the tool holder (e.g., closing action(s) of one or more movable portions of the holder). By themselves, these variances can be deemed fairly negligible; however, they can present issues when encountered collectively, such as in the circumstance of loading forming tools in tool holders. For example, such variances can result in a corresponding degree of play for the tooling once loaded into the tool holders. To account for such variances, areas of tolerance have been provided in tool holder designs. For example, tool holders have often been equipped with shape memory materials or structures such as springs to provide such areas of tolerance within the designs. However, even with the addition of such elements, issues of looseness or play between tool and holder can still be found to exist. Moreover, such shape memory materials or structures are another variable of the set-up which warrants periodic maintenance or replacement.

Thus, there remains a need for a tool holder design that accounts for the above-described issues as well as others, and in so doing to provide both an effective and efficient tool holder usable with tools having different tang styles.

SUMMARY OF THE INVENTION

Embodiments of the invention involve tool holder and differing designs of movable portions that can be interchangeably mounted with the holder depending on the tang profile of the tool needing to be secured, while also being seated, to the holder.

In one embodiment, a tool holder is provided. The tool holder comprises a stationary portion having a vertically-oriented wall and a bottom surface, and comprises a movable portion pivotably secured to the stationary portion and defining an inner wall oriented toward the vertically-oriented wall of the stationary portion. The inner wall includes a lower surface that is shaped to secure a tang of a forming tool between the movable portion and the stationary portion. The lower surface defines a clamping region configured to align with a corresponding tool tang surface. The clamping region is shaped so as to have an upper convex segment and a lower concave segment, whereby said convex segment is configured to contact and secure corresponding tool tang surface without contact being made between said tool tang surface and lower concave segment when pivoted into a clamped configuration relative to the stationary portion.

In a further embodiment, a method of seating and securing a forming tool to a tool holder is provided. The method comprises providing a tool holder with a stationary portion and a movable portion. The stationary portion has a vertically-oriented wall and a bottom surface. The movable portion is pivotably secured to the stationary portion and defines an inner wall oriented toward the vertically-oriented wall of the stationary portion. The inner wall includes a lower surface that defines a clamping region having an upper convex segment and a lower concave segment and a seating region extending from and oriented at an angle from the lower concave segment of the clamping region. The method comprises loading a tool between the movable portion and the stationary portion, and triggering the tool holder to be in a clamped configuration, whereby the lower surface of the moveable portion is pivoted toward a tang of the loaded tool between the movable portion and the vertically-oriented wall of the stationary portion, and whereby as a result of the pivoting of the movable portion, the tool tang is driven up the seating region such that surface of the tang aligning the clamping region contacts the convex segment of the clamping surface without contacting the convex segment.

In another embodiment, a clamping plate for a tool holder is provided. The clamping plate comprises an inner wall with lower surface that defines a clamping region and a seating region. The clamping region is shaped so as to have an upper convex segment and a lower concave segment, whereby the seating region extends from and is oriented at an angle from the lower concave segment. The lower surface is defined of a plurality of clamping fingers so as integrally link the clamping and seating regions of the inner wall. The plurality of clamping fingers provides at least two differing tolerance areas, a first tolerance area comprising a groove defined atop and extending across an extent of the fingers and a second tolerance area comprising a plurality of slits defined across a depth between each of the clamping fingers.

BRIEF DESCRIPTION OF THE DRAWINGS

The following drawings are illustrative of particular embodiments of the present invention and therefore do not limit the scope of the invention. The drawings are not necessarily to scale (unless so stated) and are intended for use in conjunction with the explanations in the following detailed description. Embodiments of the invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and other elements employ that which is known to those of ordinary skill in the field of the invention. Those skilled in the art will recognize that many of the noted examples have a variety of suitable alternatives.

Figure 1:
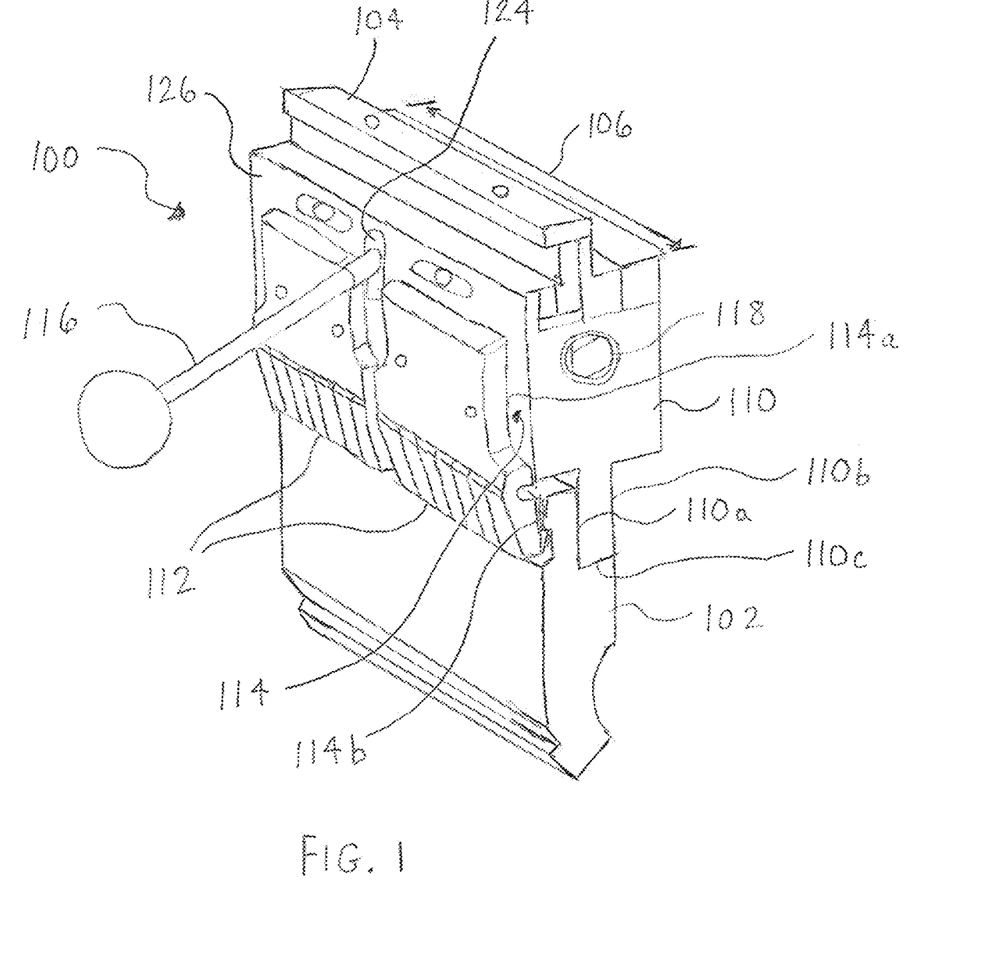
FIG. 1 is a perspective view of a tool holder in accordance with certain embodiments of the invention, wherein the tool holder is shown with exemplary forming tool loaded therein.

FIG. 1 shows a perspective view of a tool holder 100 in accordance with certain embodiments of the invention, wherein the holder 100 is depicted with exemplary forming tool 102 loaded therein. As shown, the tool holder 100 is relatively simple in form. Thus, while in certain embodiments, the holder 100 can be operatively coupled to a table (e.g., upper table) of a press brake machine (e.g., via elongated bar 104) or alternatively formed with such table, the holder 100 could just as well be used with other industrial machines. For example, the tool holder 100 can be used with industrial machines configured to provide any of a variety of forming processes, such as bending, folding, and/or forming holes in sheet metal and other workpieces. Also, while the tool holder 100 is exemplarily shown as being generally compact in size, its length in particular (e.g., length 106 of the holder 100) can be varied as desired (e.g., based on length of intended table and tooling application for a press brake).

Continuing with FIG. 1, the tool holder 100 has two principal components used for both seating and securing tooling to the holder 100, namely a stationary portion 110 and one or more movable portions 112. Relative to securing (and as is further detailed herein), this involves opposing side surfaces of the tool being contacted by corresponding surfaces of the stationary portion 110 and movable portion(s) 112, with such contacts collectively serving to fixedly clamp the tool between the movable portion(s) 112 and stationary portion 110. By way of comparison (and as is also further detailed herein), seating involves a vertical lifting of the tool so that one or more of its upper surfaces are brought into flush contact with corresponding surfaces of one or more of the stationary portion 110 and/or movable portion(s) 112, such that an operational position for the tool is achieved without any other procedures being required prior to use of the tool for its intended machining purpose.

Embodiments of the invention relate to differing movable portion designs that can be interchangeably used with a tool holder (again, an example of such is the movable portion 112, as shown in FIG. 1). To that end, depending on the tang profile of the tool needing to be seated and secured, the appropriate movable portion design would be used, such as movable portion 112 shown in FIG. 1 relative to the tool holder 100, or other alternative movable portion design, as will later described herein.

Figure 2A:
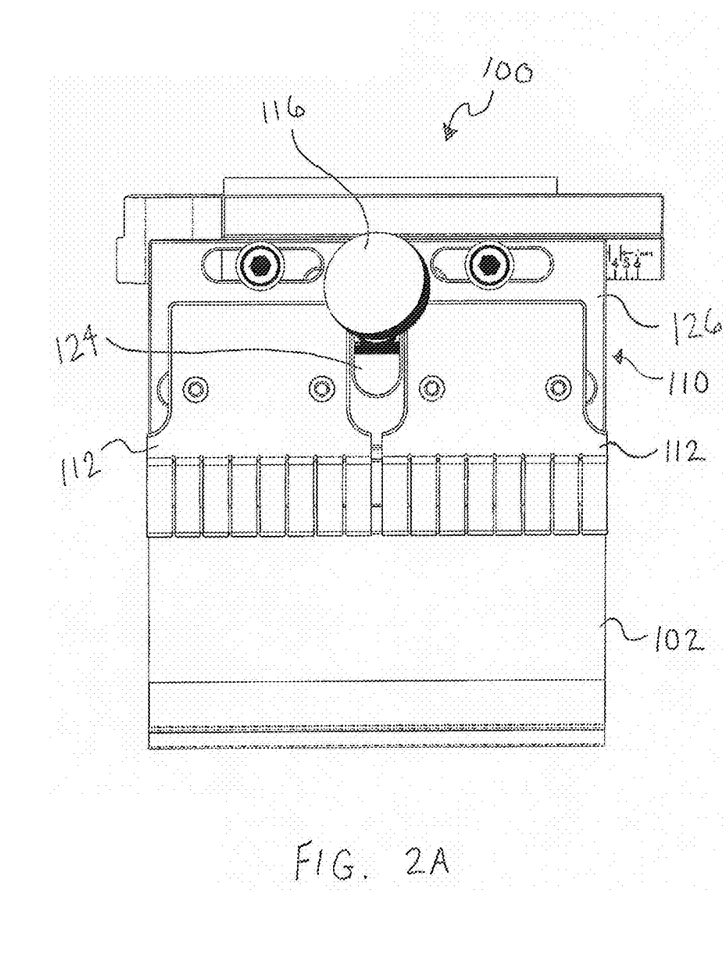
FIGS. 2A and 2B are front views of the tool holder of FIG. 1 showing clamped and unclamped configurations of the tool holder, respectively, relative to the exemplary forming tool located therein in accordance with certain embodiments of the invention.
Figure 2B:
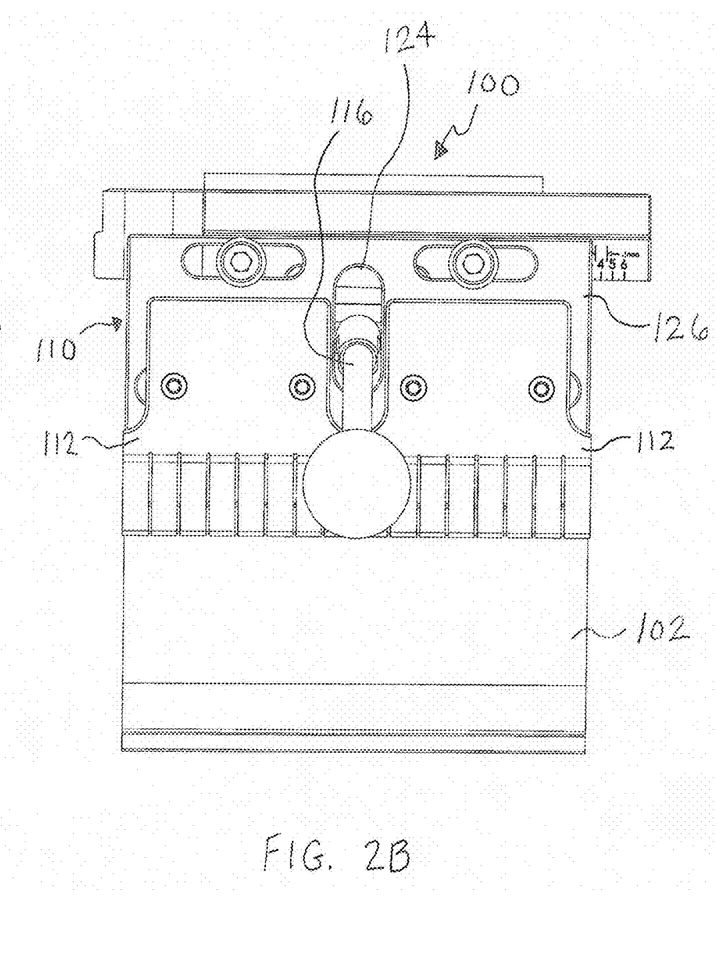

In certain embodiments, as shown, the stationary portion 110 is defined with opposing first and second walls 110a and 110b, and bottom surface 110c, which are configured for seating and securing tooling thereto. For example, tooling can be secured adjacent to either of the first wall 110a or second wall 110b of the stationary portion 110, while the tooling can typically seated up against the bottom surface 110c. As depicted in FIG. 1 (and with reference to FIGS. 2A and 2B, showing side views of the tool holder 100 in unclamped and clamped configurations), one or more movable portions 112, each with inner wall 114, can be used in concert with the first wall 110a of the stationary portion 110 for securing one or more forming tools 102 to the tool holder 100. Likewise, one or more further movable portions 112 can be situated relative to the second wall 110b of the stationary portion 110, mirroring the setup of the movable portion 112 depicted in FIG. 1 relative to the first wall 110a. As such, the tool holders embodied herein are multi-functional (via use with differing movable portion designs, as further detailed herein) and dynamic (via ready use of either of the walls 110a, 110b of the stationary portion), while their use in securing tools thereto can be kept fairly simple (by minimizing the components used therewith).

As described above, non-mechanical sources (e.g., hydraulic, pneumatic, electrical, or other like means) have often been implemented with tool holder designs to precisely regulate their actuation. However, use of such sources has also typically resulted in enhanced complexity and/or cost for the system. In contrast to such systems, the tool holder 100, in certain embodiments, is mechanically actuated. To that end, an actuator mechanism can be utilized that is easily accessed and in turn used by an operator. For instance, with reference back to the tool holder 100 of FIG. 1, a handle or arm 116 is shown to extend from the holder 100. In certain embodiments (and with reference to FIGS. 2A and 2B), the handle 116, when moved by an operator to a raised position (FIG. 2A), results in the tool holder 100 being in a clamped configuration with respect to the stationary and movable portions 110 and 112, while when moved to a lowered position (FIG. 2B), results in the holder 100 being in an unclamped configuration with respect to the stationary and movable portions 110 and 112.

Figure 4A:
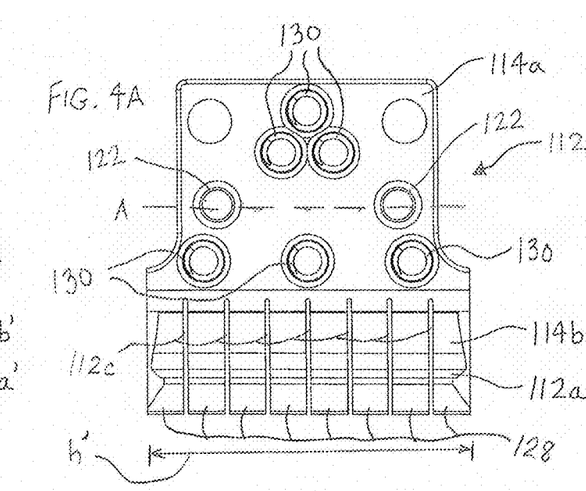
FIGS. 4A and 4B are rear and perspective views of a further clamping plate, respectively, for use with the tool holder of FIG. 1 in accordance with certain embodiments of the invention.
Figure 4B:
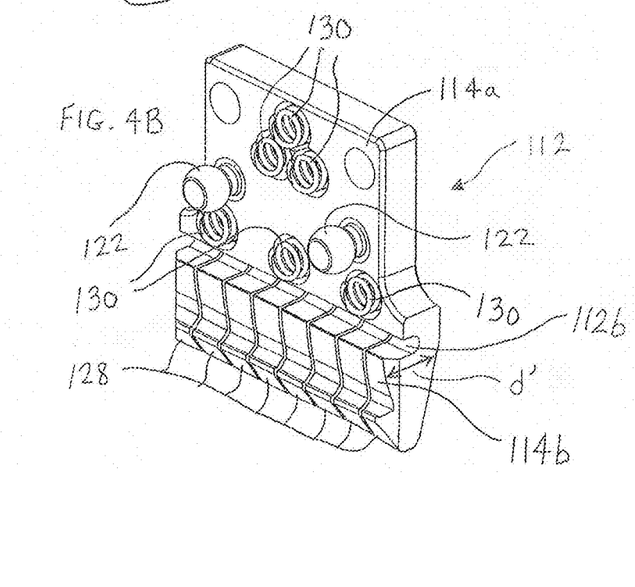

With reference back to FIG. 1, movement of the handle 116 from its lowered position (unclamped configuration of the tool holder 100) to its raised position (clamped configuration of the tool holder 100) triggers pivoting of the movable portions 112 toward the first wall 110a of the stationary portion 110. In certain embodiments, this pivoting of the movable portions 112 is due to contact from a cam body 118 (for example, as shown, positioned internal to the stationary portion 110 of the tool holder 100). To that end, the handle 116 being moved to its raised position causes rotation of the cam body 118, which in turn contacts an upper surface 114a of the inner wall 114 of each movable portion 112 of the tool holder 100. Via this contact, each of the movable portions 112 consequently pivot (e.g., about one or more mounting stems 122 thereof; shown in FIG. 4B), such that a lower surface 114b of the inner wall 114 of each movable portion 112 moves in unison toward forming tool 102. As will described later herein, such action by the movable portion(s) 112 results in the tool 102 being seated and secured to the holder 100.

Continuing with the above embodiment, opposing movement of the handle 116 from its raised position (clamped configuration of the tool holder 100) to its lowered position (unclamped configuration of the tool holder 100) causes an opposing rotation of the cam body 118. To that end, the cam body 118 moves away from the upper surface 114a of the inner wall 114 of each of the tool holder movable portions 112. As such, the movable portions 112 consequently pivot (again, about the one or more mounting stems 122 thereof), such that the lower surface 114b of the inner wall 114 of each movable portion 112 moves (again in unison) back from the forming tool 102 loaded in the holder 100. However, despite this movement, in certain embodiments, the lower surface 114b of each movable portion 112 can maintain contact with the tool 102 so as to continue to retain, and thereby prevent, the tool 102 from being released from the holder 100. Again, more detail is later provided herein with respect to action by the movable portion(s) 112 via such unclamping of tools with respect to the tool holder 100.

Thus, at this point, the tool holder 100 can be configured to be mechanically actuated. Such mechanical actuation, in certain embodiments, stems from an actuator mechanism being provided with the tool holders and made accessible so as to be manually adjusted. To that end, in certain embodiments, the actuator mechanisms are configured to be adjusted via operator action. In cases of seating and securing a tool within the tool holders, in certain embodiments, the manual adjustment made to the actuator mechanism is performable in a singular step or action.

Notwithstanding the above, it should be appreciated that a variety of other mechanical actuator mechanisms could just as well be used (alternate to the handle 116) to trigger pivoting of the one or more movable portions 112 of the tool holder 100. For example, if a more compact profile were desired for the actuator mechanism, the mechanism could take the form of a set screw (such as Allen screw) or even a push button. To that end, in certain embodiments, the actuator mechanism could be coupled to the movable portion 112 so as to not warrant inclusion of the cam body 118. Further, in certain embodiments, if corresponding complexity and/or cost could be made more applicable, a non-mechanical source (such as hydraulic, pneumatic, electrical, or other like means) can be implemented with the tool holder designs to precisely regulate their actuation.

As already noted, the tool holder 100 is applicable for mounting one or more forming tools 102 on either of the opposing walls 110a, 110b of the stationary portion 110. To that end, and in further applying the concept of the cam body 118 already described, its size could be correspondingly configured to extend and similarly contact the upper surface 114a of the inner wall 114 of a movable portion 112 located on either side of the tool holder 100 when the body 118 is actuated (rotated). Thus, no matter which of the two opposing walls 110a or 110b of the stationary portion 110 is slated for use in securing a tool 102 to the tool holder 100, in using a correspondingly-sized cam body 118, a single actuator mechanism could be used to trigger switching between clamping and unclamping configurations for each of the opposing walls 110a and 110b of the stationary portion 110 and their corresponding movable portions 112.

With the above description serving as a backdrop, focus is turned back to the tool holder 100 of FIG. 1. As already noted above, the tool holder 100 involves a limited quantity of components for seating and securing tools thereto. For actuation of the tool holder 100, in certain embodiments, the handle 116 is used, and in certain embodiments (with reference to FIGS. 2A and 2B), such handle 116 can be configured to extend from a bore 124 defined in the stationary portion 110 (e.g., in front wall 126). As already described, the tool holders embodied herein (such as holder 100 of FIG. 1) are configured to allow for seating and securement thereto of tools having differing tang profiles. For example, with reference to the holder 100 of FIG. 1, such multi-functionality is accomplished via selective use of differing designs of movable portions (e.g., movable portion 112) therewith, and so as to cooperate with the stationary portion 110 of the holder 100. Limiting the variance to one component (i.e., the movable portions of the tool holder) enables the tool holders to be relatively simple, while also providing universal manner by which tools with varying tang profiles can be seated and secured.

In certain embodiments, the tool holder 100 and the movable portions (e.g., movable portion 112) used therewith are configured for European tooling and the differing tang profiles therefor; however, it should be appreciated that base concepts of the described embodiments can also be applied to other tooling styles. As described above, the differing tang profiles for European style tooling can involve vertically-straight or beveled surfaces. To that end, and with reference to FIGS. 3A/3B and 4A/4B, differing designs of movable portions 112' and 112 for functioning with tool tangs having vertically-straight profiles and having beveled profiles, respectively, are depicted in accordance with certain embodiments of the invention. Continuing with FIGS. 3A/3B and 4A/4B, as shown, the movable portions 112' and 112 concern clamping plates, each of which is similar in design but for their lower surfaces 114b' and 114b, which are formed with one or more clamping fingers 128' and 128. In certain embodiments, as shown, the lower surfaces 114b' and 114b are each formed with a plurality of clamping fingers 128' and 128. The particular design and functioning of these fingers 128' and 128 is further detailed herein with respect to FIGS. 5A/5B, 6A/6B, 7A/7B, and 8A/8B.

Figure 3A:
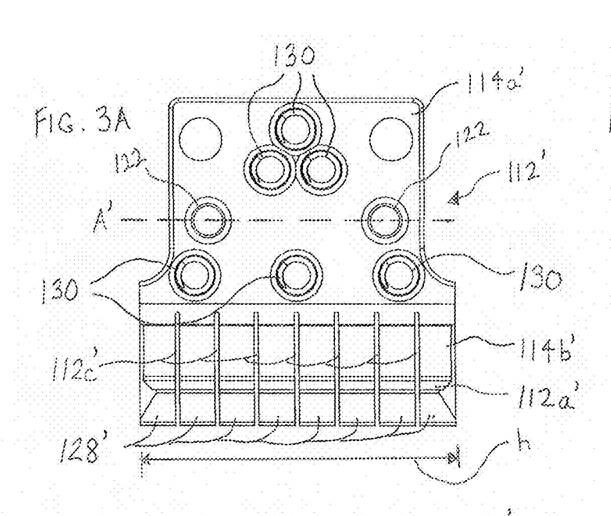
FIGS. 3A and 3B are rear and perspective views of a clamping plate, respectively, for use with the tool holder of FIG. 1 in accordance with certain embodiments of the invention.
Figure 3B:
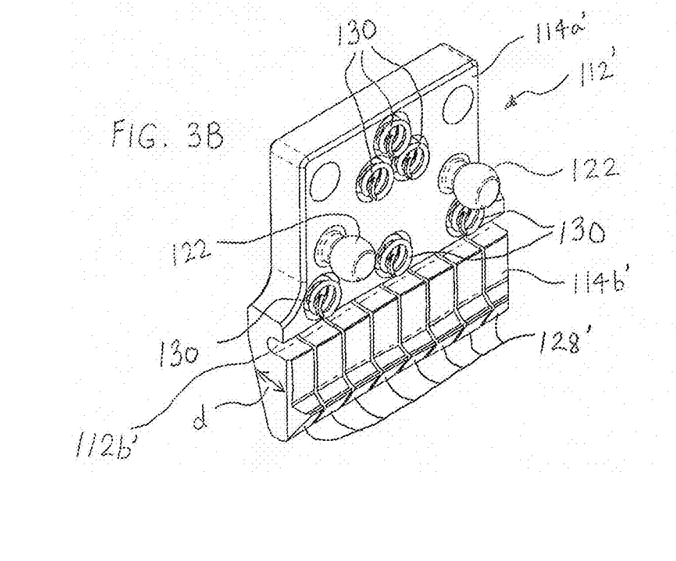

However, before moving on from FIGS. 3A/3B and 4A/4B, features shown protruding from the upper surfaces 114a' and 114a of the inner walls 114' and 114 are noted. For example, each includes a pair of the mounting stems 122 (already described herein), which function collectively on each movable portion 112' and 112 in forming a pivot axis A' and A, about which the portions 112' and 112 pivot when shifting the tool holder 100 between clamped and unclamped configurations. In addition, the mounting stems 122 allow for easy change out of the movable portions 112' and 112 relative to tool holders. For example, as shown, the stems 122 of movable portion 112, having ball-shaped heads, are designed to pop in and out of corresponding mounting holes (not shown) in the stationary portion 110 of the tool holder 100. This mounting design not only aids the operator in easy change-out of the movable portions 112' and 112 relative to a tool holder, as warranted, but also permits free movement of the ball-shaped heads within their mounting holes to enable pivoting of the portions 112' and 112. Furthermore, a plurality of springs 130 is shown, positioned atop and below the mounting stems 122 for each of the movable portions 112' and 112, which provide differing degrees of tolerance relative to either the unclamped or clamped configurations of the tool holders, as detailed with respect to FIGS. 5A/5B, 6A/6B, 7A/7B, and 8A/8B.

As described above, embodiments of the invention involve differing styles of movable portions being selectively and interchangeably usable with a tool holder. To that end, depending on the tang profile of the tool needing to be secured to the tool holder, such as tool 102 having beveled tang profile as exemplified in FIG. 1, the appropriate movable portion, namely the movable portion 112, would be appropriately used with the tool holder 100. Accordingly, FIGS. 7A/7B and 8A/8B relate to use of the moving portion 112 (FIGS. 4A/4B) relative to seating and securing tool 102 with beveled tang profiles, while FIGS. 5A/5B and 6A/6B relate to use of the moving portion 112' (FIGS. 3A/3B) relative to seating and securing a tool 102' with vertically-straight tang profile.

Figures 5A, 5B:
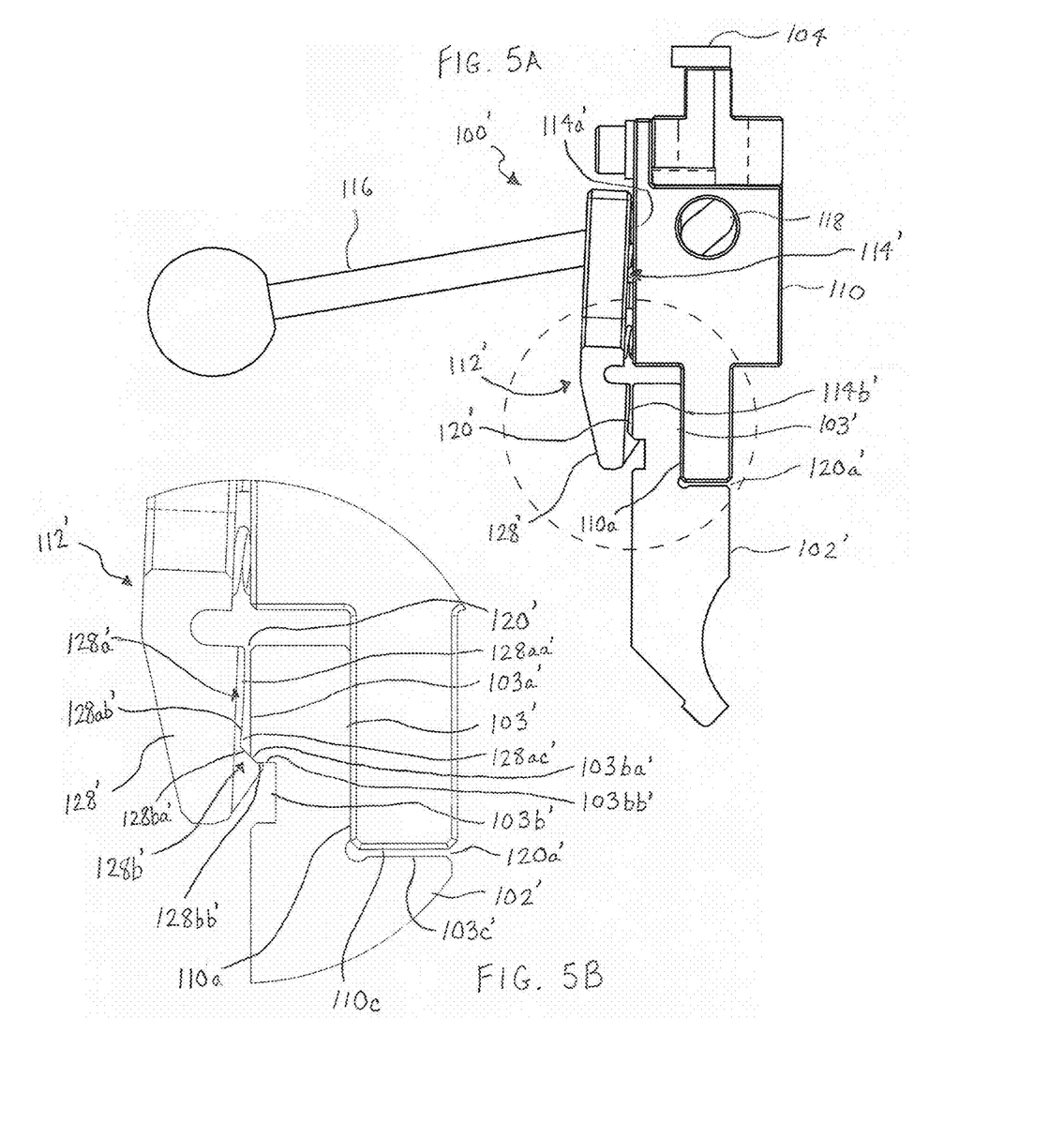
FIG. 5A is a side view of a tool holder configured with the clamping plate of FIGS. 3A and 3B, and shown in unclamped configuration relative to a forming tool in accordance with certain embodiments of the invention.
FIG. 5B is an enlarged partial view of the tool holder of FIG. 5A.
Figures 6A, 6B:
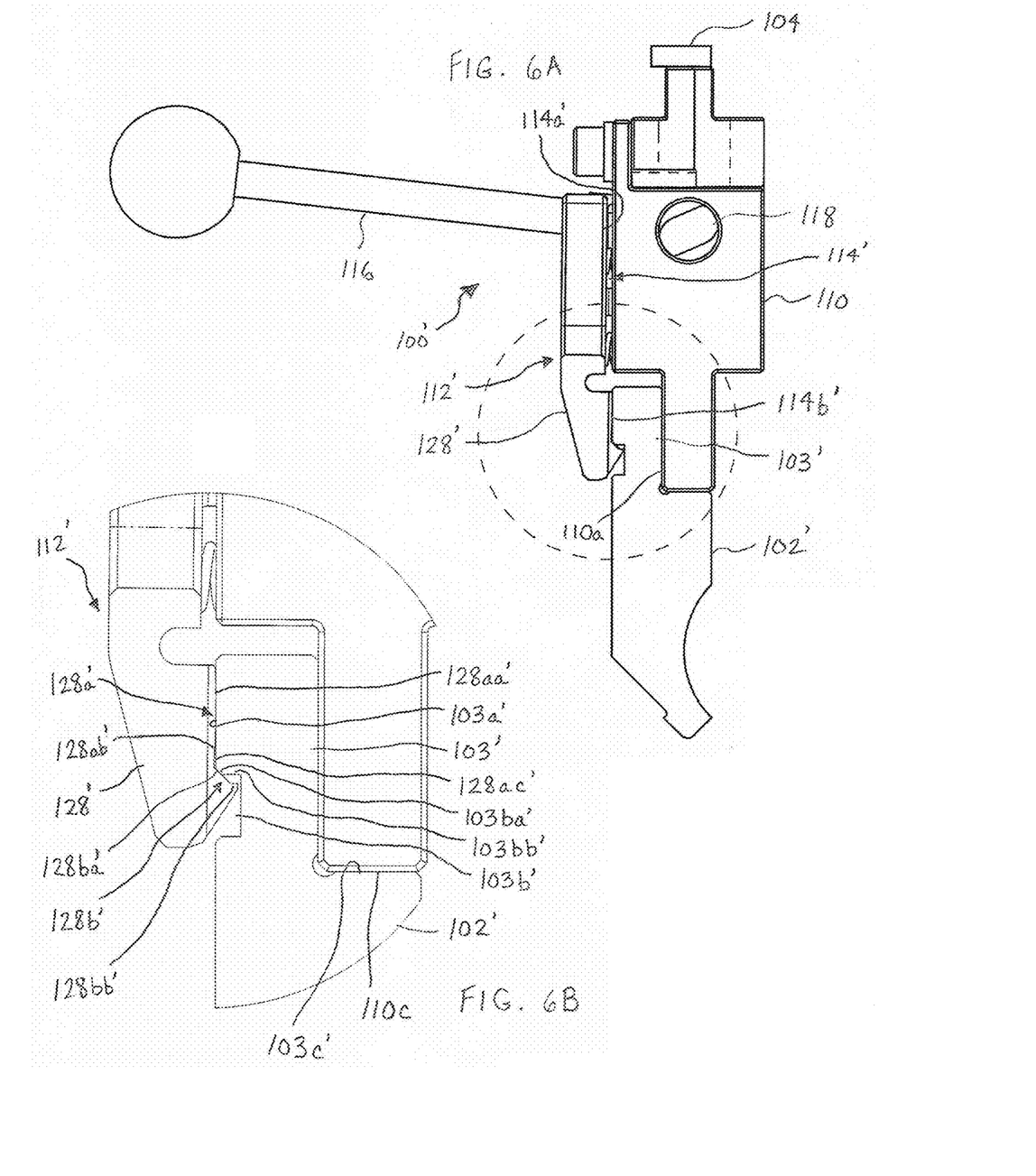
FIG. 6A is a side view of the tool holder, clamping plate, and forming tool of FIG. 5A, with the tool holder shown in clamped configuration in accordance with certain embodiments of the invention.
FIG. 6B is an enlarged partial view of the tool holder of FIG. 6A.

Starting with FIGS. 5A and 6A, as described above, shown therein is a tool holder 100' in unclamped and clamped configurations, respectively, and employing the movable portion 112' (of FIGS. 3A and 3B) for use relative to forming tool 102' (with vertically-straight tang profile). As shown in FIG. 5A, with the tool holder 100' in an unclamped configuration (which is evident from the handle 116 being positioned in the lowered position, as already exemplarily described), there is a clamping gap 120' between the movable portion 112' and tang 103' of the tool 102', as well as a seating gap 120a' between stationary portion 110 and the tool tang 103'. Such gaps 120' and 120a' are even more apparent from FIG. 5B, showing enlarged partial view of FIG. 5A.

As previously described, the lower surface 114b' of the inner wall 114' of the movable portion 112' is defined of one or more clamping fingers 128'. To that end, with reference to FIG. 5B, each of the fingers 128' is defined with two primary regions for securing and seating the tool 102', namely a clamping region 128a' and a seating region 128b'. As its name implies, the clamping region 128a' is generally associated with securement of the tang 103' (and correspondingly, the tool 102') when the tool holder 100' is in the clamped configuration. To that end, the clamping region 128a' is configured to generally align with opposing side surface 103a' of the tool tang 103'. The clamping region 128a' is shaped so as to have an upper convex or clamping segment 128aa' which transitions into a lower concave or clearance segment 128ab'. To that end, and with reference to the opposing tang surface 103a', the convex segment 128aa' ramps outward toward the tang surface 103a', while the concave segment 128ab' falls away from the surface 103a', creating a corresponding recess 128ac' at the segment 128ab'.

By way of comparison, the seating region 128b' of each of the fingers 128' has an angled segment 128ba' and a shelf segment 128bb'. As its name implies, the seating region 128b' is generally associated with seating of the tang 103' (and correspondingly, the tool 102') when the tool holder is in the clamped configuration. To that end, the seating region 128b' is configured to generally align with the safety slot 103b' of the tool tang 103'. Thus, in the unclamped configuration of the tool holder 100', and with reference to FIG. 5B, on account of the movable portion 112' having been shifted away from the first wall 110a of the stationary portion 110 of the tool holder 100', its fingers 128' correspondingly are shifted back from the tool 102'. However, in certain embodiments, the seating region 128b' continues to extend into the tang safety slot 103b', whereby the tool 102' is still retained by the tool holder 100' from contact between the angled segment 128ba' and upper corner or edge 103ba' defining the slot 103b' and between the shelf segment 128bb' and upper surface 103bb' further defining the slot 103b'. Although, on account of the fingers 128' having been shifted back from the tool 102', the tool 102' has become unseated (vertically lowered) from the tool holder 100', with corresponding seating gap 120a' having been opened between bottom surface 110c of the stationary portion 110 of the tool holder 100' and aligning tang surface 103c'.

Shifting to FIG. 6A (and with reference to FIG. 6B, showing enlarged partial view of FIG. 6A), with the tool holder 100' in clamped configuration (evident from the handle 116 being positioned in the raised position, as already exemplarily described), the previously-described clamping gap 120' between the movable portion 112' and tool tang 103', and seating gap 120a' between stationary portion 110 and tool tang 103', have been closed, to extents as are possible. To that end, in the course of the tool assembly 100' being switched to the clamped configuration relative to the tool 102', the movable portion 112' is actuated to pivot toward the first wall 110a of the stationary portion 110 of the tool holder 100'. Correspondingly, each of the fingers 128' is pivoted inward relative to corresponding portions of the tool tang 103'. For example, as shown and relative to the seating region 128b', the upper corner/edge 103ba' defining the safety slot 103b' is driven upward along the angled segment 128ba'. It should be appreciated that in the process, the tang 103' is correspondingly driven to a seated position, with corresponding seating gap 120a' between bottom surface 110c of the stationary portion 110 of the tool holder 100' and aligned tang surface 103c' being closed. Contacting portions of said upper corner/edge 103ba' and angled segment 128ba', in certain embodiments, have similar, yet not same, surface angles to minimize potential binding of such contacting surfaces when the upper corner/edge 103ba' is moved relative to the angled segment 128ba'. The movable portion 112', in certain embodiments, is Nitrex® coated, which is known in the industry as involving a nitriding/nitro-carburizing process that permeates tool steel to achieve a surface hardness of HRC-70 for enhanced durability and performance, enabling the outer surfaces to exhibit enhanced lubricity. To that end, such Nitrex® coating for the movable portion 112', and particularly with respect to the nitriding/nitro-carburizing process therefor, should not be confused with other coating processes, such as nitro-carburizing, nitriding, or case hardening (to name but a few), which, while admittedly having certain similarities, differ fundamentally both in their approach (process used) and end result (coating achieved).

Continuing with reference to FIG. 6B, at about the same moment at which the seating gap 120a' between bottom surface 110c of the stationary portion 110 of the tool holder 100' and aligning tang surface 103c' is closed, upper portion of the side surface 103a' of the tool tang 103' comes in contact with upper convex segment 128aa' of the clamping region 128a'. Conversely, due to the recess 128ac' defined by the lower concave segment 128ab', the lower portion of the side surface 103a' of the tool tang 103' does not contact said segment 128ab'. Thus, by preventing such contact between the tang 103' and the lower concave segment 128ab', between such seating point of contact (relative to bottom surface 110c of stationary portion 110 and aligned tang surface 103c') and securing point of contact (relative to upper portion of tang side surface 103a' and upper convex segment 128aa'), potential for such contact aversely affecting proper seating and securement contact points is averted.

Figures 7A, 7B:
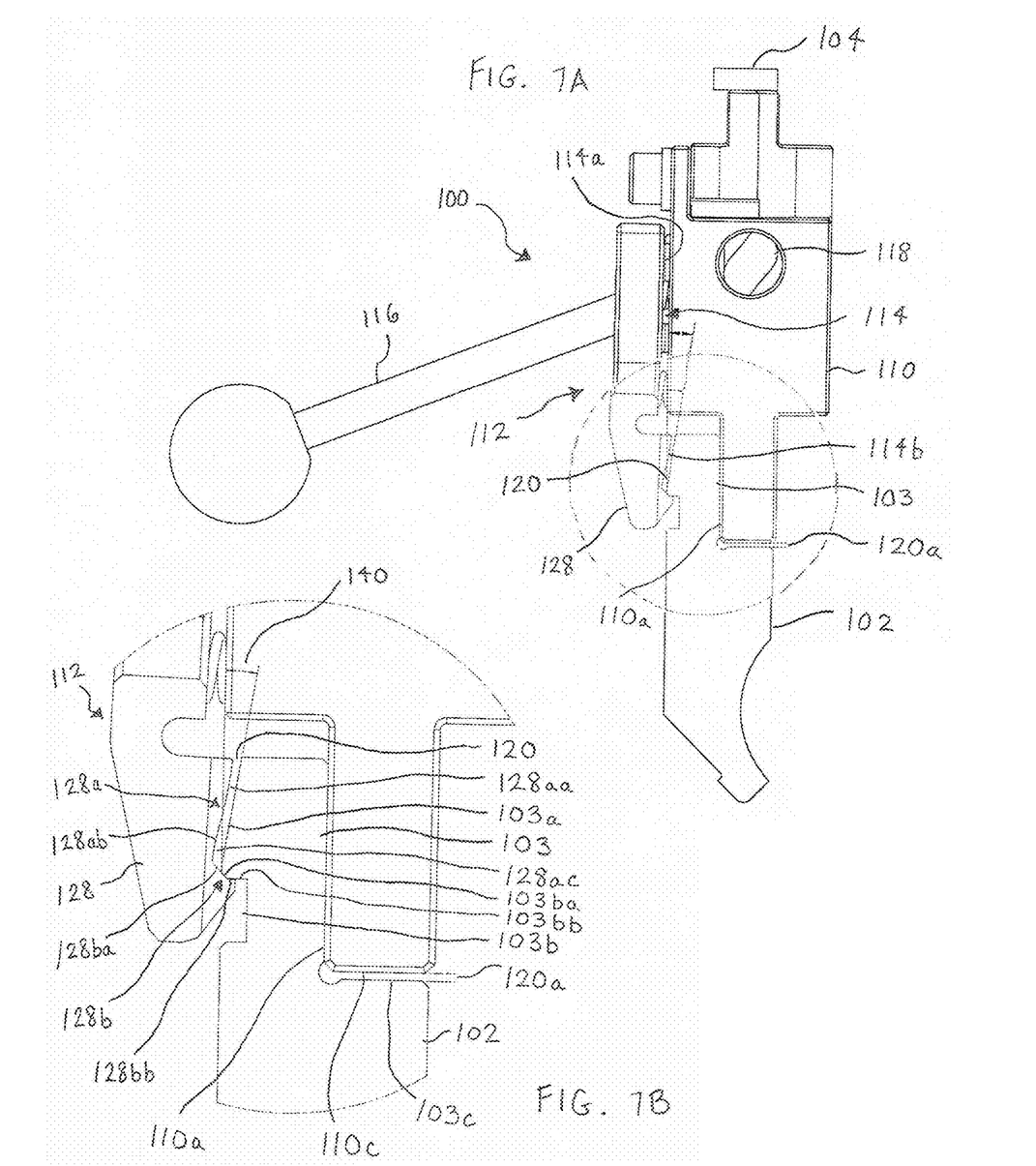
FIG. 7A is a side view of the tool holder of FIG. 1 configured with the clamping plate of FIGS. 4A and 4B, and shown in unclamped configuration relative to a forming tool in accordance with certain embodiments of the invention.
FIG. 7B is an enlarged partial view of the tool holder of FIG. 7A.
Figures 8A, 8B:
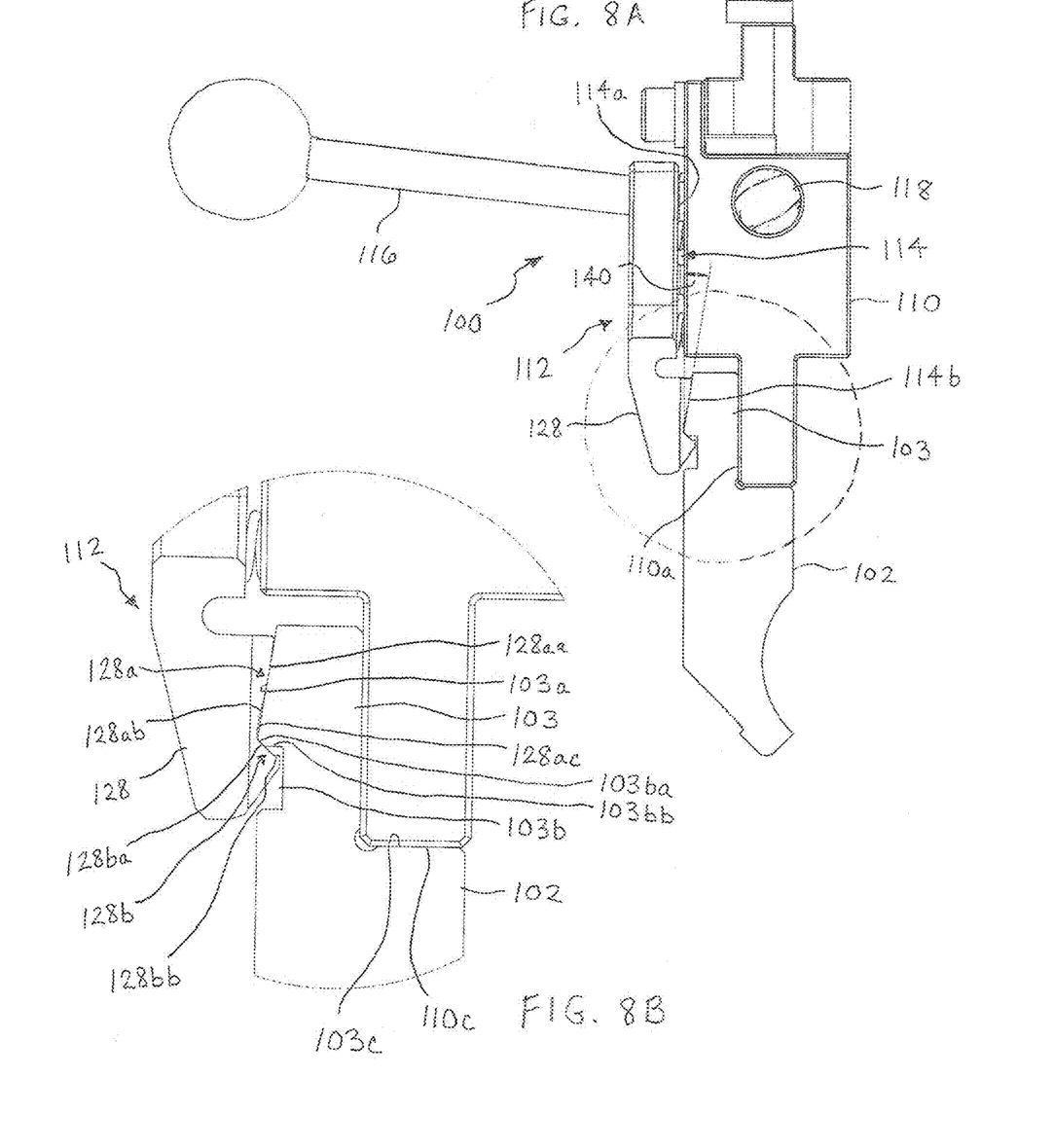
FIG. 8A is a side view of the tool holder, clamping plate, and forming tool of FIG. 7A, with the tool holder shown in clamped configuration in accordance with certain embodiments of the invention.
FIG. 8B is an enlarged partial view of the tool holder of FIG. 8A.

Turning to FIGS. 7A and 8A, as described above, shown therein is the tool holder 100 of FIG. 1 in unclamped and clamped configurations, respectively, and employing the movable portion 112 (of FIGS. 4A and 4B) for use relative to forming tool 102 (with beveled tang profile). As shown in FIG. 7A, with the tool holder 100 in an unclamped configuration (evident from the handle 116 being positioned in the lowered position, as already exemplarily described), there is a clamping gap 120 between the movable portion 112 and tang 103 of the tool 102, as well as a seating gap 120a between stationary portion 110 and the tool tang 103. Such gaps 120 and 120a are even more apparent from FIG. 7B, showing enlarged partial view of FIG. 7A.

As previously described, the lower surface 114b of the inner wall 114 of the movable portion 112 is defined with one or more clamping fingers 128. To that end, with reference to FIG. 7B, each of the fingers 128 is defined with two primary regions for securing and seating the tool 102, namely a clamping region 128a and a seating region 128b. As its name implies, the clamping region 128a is generally associated with securement of the tang 103 (and correspondingly, the tool 102) when the tool holder 100 is in the clamped configuration. To that end, the clamping region 128a is configured to generally align with opposing side surface 103a of the tool tang 103. The clamping region 128a is shaped so as to have an upper convex or clamping segment 128aa which transitions into a lower concave or clearance segment 128ab. To that end, and with reference to the opposing tang surface 103a, the convex segment 128aa ramps outward toward the tang surface 103a, while the concave segment 128ab falls away from the surface 103a, creating a corresponding recess 128ac at the segment 128ab.

By way of comparison, the seating region 128b of each of the fingers 128 has an angled segment 128ba and a shelf segment 128bb. As its name implies, the seating region 128b is generally associated with seating of the tang 103 (and correspondingly, the tool 102) when the tool holder is in the clamped configuration. To that end, the seating region 128b is configured to generally align with the safety slot 103b of the tool tang 103. Thus, in the unclamped configuration of the tool holder 100, and with reference to FIG. 7B, on account of the movable portion 112 having been shifted away from the first wall 110a of the stationary portion 110 of the tool holder 100, its fingers 128 correspondingly are shifted back from the tool 102. However, in certain embodiments, the seating region 128b continues to extend into the tang safety slot 103b, whereby the tool 102 is still retained by the tool holder 100 from contact between the angled segment 128ba and upper corner or edge 103ba defining the slot 103b and between the shelf segment 128bb and upper surface 103bb further defining the slot 103b. Although, on account of the fingers 128' having been shifted back from the tool 102, the tool 102 has become unseated (vertically lowered) from the tool holder 100, with corresponding seating gap 120a having been opened between bottom surface 110c of the stationary portion 110 of the tool holder 100 and aligning tang surface 103c.

Shifting to FIG. 8A (and with reference to FIG. 8B, showing enlarged partial view of FIG. 8A), with the tool holder 100 in clamped configuration (evident from the handle 116 being positioned in the raised position, as already exemplarily described), the previously-described clamping gap 120 between the movable portion 112 and tool tang 103, and seating gap 120a between stationary portion 110 and tool tang 103, have been closed, to extents as are possible. To that end, in the course of the tool assembly 100 being switched to the clamped configuration relative to the tool 102, the movable portion 112 is actuated to pivot toward the first wall 110a of the stationary portion 110 of the tool holder 100. Correspondingly, each of the fingers 128 is pivoted inward relative to corresponding portions of the tool tang 103. For example, as shown and relative to the seating region 128b, the upper corner/edge 103ba defining the safety slot 103b is driven upward along the angled segment 128ba. It should be appreciated that in the process, the tang 103 is correspondingly driven to a seated position, with corresponding seating gap 120a between bottom surface 110c of the stationary portion 110 of the tool holder 100 and aligned tang surface 103c being closed. Contacting portions of said upper corner/edge 103ba and angled segment 128ba, in certain embodiments, have similar, yet not same, surface angles to minimize potential binding of such contacting surfaces when the upper corner/edge 103ba is moved relative to the angled segment 128ba. The movable portion 112, in certain embodiments, is Nitrex® coated, which is known in the industry as involving a nitriding/nitro-carburizing process that permeates tool steel to achieve a surface hardness of HRC-70 for enhanced durability and performance, enabling the outer surfaces to exhibit enhanced lubricity. To that end, such Nitrex® coating for the movable portion 112, and particularly with respect to the nitriding/nitro-carburizing process therefor, should not be confused with other coating processes, such as nitro-carburizing, nitriding, or case hardening (to name but a few), which, while admittedly having certain similarities, differ fundamentally both in their approach (process used) and end result (coating achieved).

Continuing with reference to FIG. 8B, at about the same moment at which the seating gap 120a between bottom surface 110c of the stationary portion 110 of the tool holder 100 and aligning tang surface 103c is closed, upper portion of the side surface 103a of the tool tang 103 comes in contact with upper convex segment 128aa of the clamping region 128a. Conversely, due to the recess 128ac defined by the lower concave segment 128ab, the lower portion of the side surface 103a of the tool tang 103 does not contact said segment 128ab. Without contact between the tang 103 and the lower concave segment 128ab, and in fact defining the recess 128ac to prevent such contact, neither seating of the tool 102 (relative to contact between the bottom surface 110c of stationary portion 110 and aligned tang surface 103c) and securing of the tool 102 (relative to contact between the upper portion of tang side surface 103a and upper convex segment 128aa) can be adversely affected. Put another way, the movable portion 112, and the fingers 128 defined thereon relative to their clamping regions 128a and seating regions 128b, so as to achieve seating and clamping simultaneously when the tool holder 100 is switched to its clamped configuration.

Apparent from the movable portions 112' and 112 embodied herein, and as noted herein, their clamping fingers 128' and 128, respectively, and notably the clamping regions 128a' and 128a thereof, are configured to align and mate with profiles of the tang side surfaces 103a' and 103a of the corresponding tools 103' and 103. Regarding this alignment, the corresponding design concerning clamping region is less complicated when concerning tang profiles with vertically-straight surfaces, such as with surface 103a' of the tool tang 103'. By way of comparison, when dealing with beveled (or angled) tang surfaces, such as with surface 103 of the tool tang 103, clamping region of the movable portion, such as the region 128a' of movable portion 112', can be configured to have similar angle relative to vertical; however, there are limits, particularly relative to corresponding effect on the warranted clamping pressure applied to the tool. For reference, the angle 140 of tang profile relative to vertical tang 103' of the tool 102' is 9°. To that end, the angle of tang profile is not known to significantly vary for European style tooling, generally being less than 12°. In certain embodiments, the angle 140 is 12° or less. In perhaps more preferable embodiments, the angle 140 is in the range of 5° and 12°, and perhaps in even more preferable embodiments, the angle 40 is in the range of 7° and 10°.

As described above, built-in tolerance is further considered in the design of tool holders, and such consideration is not lost in the embodied tool holder designs. The tolerance areas of the tool holders 100 and 100' are configured with same tolerance areas due to common use of movable portions 112 and 112'. To that end, it has been determined for the tool holder designs embodied herein that by introducing areas of tolerance both in line with force being applied to the clamping fingers 128 and 128' (along horizontal extent of the contacting end 112a of the movable portions 112 and 112') and transverse (or crosswise) to such force (within depth of contacting end 112a, 112a' of the movable portion 112, 112'), there is enhanced tolerance gleaned from the designs. For example, there is virtually no degree of freedom or play between clamping portion(s) of tool holder 100, 100' and tools secured therein. To that end, this complementing of tolerances functions particularly well with use of the differing tool tang styles and corresponding different movable portions 112, 112' used. One rationale for this is because such tolerances areas, via their close proximities to each other and their focus on differing (e.g., transverse) planes relative to the applied forces, are better matched for collective function.

In certain embodiments, as shown in FIGS. FIGS. 3A/3B and 4A/4B, the areas of tolerance for movable portions 112' and 112 are provided as one or more of grooves or slits provided relative to the fingers 128' and 128. For example, in certain embodiments as shown, a continuous groove 112b' and 112b can be respectively defined atop the fingers 128' and 128 and across horizontal extents h' and h of the movable portions 112' and 112. In combination with the grooves 112b', 112b, in certain embodiments as shown, a plurality of slits 112c' and 112c can be respectively defined within depths d' and d of contacting end 112a' and 112a of the fingers 128' and 128. To that end, given their distribution on the movable portions 112' and 112 relative to the fingers 128' and 128, the corresponding grooves 112b', 112b and slits 112c', 112c are collectively actuated when subjected to force of 400 pounds, which is common for tool—tool holder clamping forces, but not to the extent that the tolerance otherwise provided would be negligent. For example, the actuation force could range between 300 and 500 pounds, and perhaps more ideally, between 375 and 425 pounds.

As can be appreciated from the embodied movable portions 112' and 112 of FIGS. 3A/3B and 4A/4B, respectively, and further with regard to their use with tool holder in seating and securing corresponding tools 102' and 102 therein, additional movable portion variants can be readily designed, based correspondingly on the tang profile of the tool to be used therewith relative to the tool holder. Similarly, the movable portions embodied herein are suitable for use with any variety of tool holder design, provided the tool holder designs are configured to correspondingly accommodate and use such clamping plate design, as embodied herein with respect to the movable portions 112 and 112'. To that end, designs of the movable portions 112 and 112', or variants thereof, can be provided for existing tool holders, or configured for new, wholly-provided tool holder designs, as applicable.

Thus, embodiments of a TOOL HOLDERS USABLE WITH TOOLING HAVING DIFFERENT TANG STYLES, AND SEATING/SECURING COMPONENTS OF SUCH HOLDERS are disclosed. One skilled in the art will appreciate that the invention can be practiced with embodiments other than those disclosed. The disclosed embodiments are presented for purposes of illustration and not limitation, and the invention is limited only by the claims that follow.

What is claimed is:

1. A tool holder comprising:
   a stationary portion having a vertically-oriented wall and a bottom surface; and
   a movable portion pivotably secured to the stationary portion and defining an inner wall oriented toward the vertically-oriented wall of the stationary portion, the inner wall including a lower surface that is shaped to secure a tang of a forming tool between the movable portion and the stationary portion;
   wherein the lower surface defines a clamping region having a shape along its extent configured to align with a corresponding tool tang surface, the clamping region along said extent having an upper convex segment and a lower concave segment; and
   wherein the lower surface further defines a seating region configured to align with a safety slot of the tool tang, the seating region extending from and oriented at an angle from the lower concave segment of the clamping region;
   the clamping and seating regions being integrally linked, the angled seating region configured such that the tool tang comes into contact with and moves to a raised position on the angled seating region with corresponding pivoting of the movable portion to a clamped configuration;
   whereby when said movable portion is pivoted into the clamped configuration relative to the stationary portion said convex segment is configured to close upon and contact corresponding tool tang surface and said concave segment is configured to close upon corresponding tool tang surface yet define a recess therebetween.

2. The tool holder of claim 1 further comprising an actuator mechanism operably linked to the movable portion to trigger pivoting of the movable portion toward the stationary portion in the clamped configuration.

3. The tool holder of claim 2 wherein the actuator mechanism is a mechanically-actuated structure that is movable between two positions that correspond with pivoting of the movable portion between an unclamped configuration and the clamped configuration.

4. The tool holder of claim 1 wherein the angled seating region is configured such that the tool tang comes into contact with and moves between a lowered position and the raised position on the angled seating region with corresponding pivoting of the movable portion between an unclamped configuration and the clamped configuration.

5. The tool holder of claim 4 wherein the movable portion comprises one or more clamping fingers which define the lower surface of the movable portion, thereby integrally linking the clamping and seating regions of the movable portion.

6. The tool holder of claim 5 wherein the movable portion comprises a plurality of clamping fingers, the plurality of clamping fingers providing at least two differing tolerance areas, a first tolerance area comprising a groove defined atop and extending across an extent of the fingers and a second tolerance area comprising a plurality of slits defined across a depth between each of the clamping fingers.

7. The tool holder of claim 1 wherein the movable portion is a clamping plate, the clamping region of the plate being at an angled orientation relative to the vertically-oriented wall in order to align with an angled orientation of the corresponding tool tang surface.

8. The tool holder of claim 7 wherein the angled orientation is 12° or less from vertical.

9. A method of seating and securing a forming tool to a tool holder comprising:
   providing a tool holder with a stationary portion and a movable portion, the stationary portion having a vertically-oriented wall and a bottom surface, the movable portion pivotably secured to the stationary portion and defining an inner wall oriented toward the vertically-oriented wall of the stationary portion, the inner wall including a lower surface that defines a clamping region having an upper convex segment and a lower concave segment and a seating region extending from and oriented at an angle from the lower concave segment of the clamping region, the clamping and seating regions being integrally linked;
   loading a tool between the movable portion and the stationary portion; and
   triggering the tool holder to be in a clamped configuration, whereby the lower surface of the moveable portion is pivoted toward a tang of the loaded tool between the movable portion and the vertically-oriented wall of the stationary portion, and whereby as a result of the pivoting of the movable portion, the tool tang is driven to contact and move to a raised position on the seating region whereby a surface of the tang aligning with the clamping region contacts the convex segment of the clamping surface while defining a recess with the concave segment.

10. The method of claim 9 wherein triggering the tool holder to be in the clamped configuration comprises switching of an actuator mechanism operably linked to the movable portion to trigger pivoting of the movable portion.

11. The method of claim 10 wherein the actuator mechanism is a mechanically-actuated structure and switching of such structure involves movement of said structure from a first position of the structure corresponding to an unclamped configuration of the tool holder to a second position corresponding to the clamped configuration.

12. The method of claim 9, further comprising steps of removing the movable portion from the tool holder and replacing the movable portion with other movable portion that has a differing angle between seating and clamping regions so as to correspond with the tang surface.

13. The method of claim 12, wherein the movable portion comprises a pair of mounting stems with ball-shaped ends, whereby the step of removing the movable portion from the tool holder involves popping said ball-shaped ends from corresponding bores in stationary portion of the tool holder.

14. The method of claim 9, wherein the bottom surface of the stationary portion is contacted by opposing surface of the tool tang at same time as the surface of the tang aligning the clamping region contacts the convex segment of the clamping surface without contacting the concave segment.

* * * * *